United States Patent [19]

Gill

[11] Patent Number: 4,865,253
[45] Date of Patent: * Sep. 12, 1989

[54] SPRAYING EQUIPMENT

[75] Inventor: David C. Gill, Bristol, England

[73] Assignee: Nomix Manufacturing Co., Ltd., Bristol, England

[*] Notice: The portion of the term of this patent subsequent to Dec. 15, 2004 has been disclaimed.

[21] Appl. No.: 224,188

[22] Filed: Jul. 20, 1988

Related U.S. Application Data

[63] Continuation of Ser. No. 97,862, Sep. 17, 1987, abandoned, which is a continuation of Ser. No. 836,835, Jun. 3, 1986, Pat. No. 4,712,738.

[30] Foreign Application Priority Data

Mar. 18, 1985 [EP] European Pat. Off. ......... 85301865.3
Sep. 25, 1985 [GB] United Kingdom ................. 8523647

[51] Int. Cl.$^4$ .............................................. B05B 3/02
[52] U.S. Cl. ..................................... 239/74; 239/214; 239/538; 239/579; 239/581.1
[58] Field of Search .............. 239/73, 74, 214, 222.11, 239/223, 224, 225.1, 538, 569, 579, 581.1, 700, 701, 702, 703

[56] References Cited

U.S. PATENT DOCUMENTS

| | | |
|---|---|---|
| 442,865 | 12/1890 | De Kinder . |
| 2,290,783 | 7/1942 | Turpin ............................. 251/208 |
| 2,531,650 | 11/1950 | Stagner . |
| 2,552,445 | 5/1951 | Nielsen . |
| 2,572,950 | 10/1951 | Rider ............................... 251/208 |
| 2,888,206 | 5/1959 | Waldrum . |
| 3,073,531 | 1/1963 | Kothe ............................... 239/223 |
| 3,085,749 | 4/1963 | Schweitzer et al. . |
| 3,204,836 | 9/1965 | Joffe . |
| 3,343,795 | 9/1967 | Pinke . |
| 3,346,192 | 10/1967 | Hege . |
| 3,452,931 | 7/1969 | Knowles . |
| 3,455,507 | 7/1969 | Ryder et al. . |
| 3,459,586 | 8/1969 | Kiwi et al. . |
| 3,515,307 | 6/1970 | Gach . |
| 3,998,427 | 12/1976 | Bentley ............................. 251/208 |
| 4,061,250 | 12/1977 | Tada . |
| 4,093,107 | 6/1978 | Allman et al. . |
| 4,183,499 | 1/1980 | Swartz et al. ..................... 251/208 |
| 4,225,084 | 9/1980 | Bals . |
| 4,360,155 | 11/1982 | Hubbell et al. ..................... 239/700 |
| 4,362,275 | 12/1982 | Coffee . |
| 4,407,217 | 10/1983 | Jackson . |
| 4,544,130 | 10/1985 | Stoll et al. ......................... 251/208 |
| 4,609,148 | 9/1986 | Gill . |
| 4,690,326 | 9/1987 | Gil . |

FOREIGN PATENT DOCUMENTS

| | | |
|---|---|---|
| 470835 | 12/1972 | Australia . |
| 36577 | 6/1973 | Australia ............................ 251/208 |
| 2351709 | 1/1978 | |
| 2362673 | 3/1978 | |

(List continued on next page.)

OTHER PUBLICATIONS

"An Evaluation of Fourteen Hand-Held Battery Operated Spinning Disc Sprayers," Arnold, A. C., Tropical Pest Management, vol. 29, No. 2, Jun. 1983, pp. 105–121.

Tecnoma Brochure

Primary Examiner—Andres Kashnikow
Assistant Examiner—Michael J. Forman
Attorney, Agent, or Firm—Merchant, Gould, Smith, Edell, Welter & Schmidt

[57] ABSTRACT

Spraying equipment, for example for herbicides, comprises a head for carrying a rotatable disc from which, in operation, fluid is delivered by centrifugal force. The head comprises a first cmponent (4) and a second component (2) which are relatively rotatable about axis (A). The first component (4) has an inlet aperture (33) and the second component (2) has an outlet aperture (40). The second component (2) also has a recess (44) which provides a passage connecting the inlet aperture (33) to the outlet aperture (40). Relative rotation of the components (2 and 4) varies the length and/or the flow cross-section of the passage, so as to regulate the flow of fluid to the rotatable disc.

9 Claims, 1 Drawing Sheet

FOREIGN PATENT DOCUMENTS

| | | |
|---|---|---|
| 41008 | 2/1981 | European Pat. Off. . |
| 110713 | 6/1984 | European Pat. Off. . |
| 143588 | 6/1985 | European Pat. Off. . |
| 155850 | 9/1985 | European Pat. Off. . |
| 1948980 | 4/1971 | Fed. Rep. of Germany . |
| 2127651 | 12/1971 | Fed. Rep. of Germany . |
| 2559144 | 6/1977 | Fed. Rep. of Germany . |
| 106120 | 12/1953 | New Zealand . |
| 114427 | 6/1955 | New Zealand . |
| 285699 | 2/1965 | New Zealand . |
| 148193 | 3/1967 | New Zealand . |
| 150941 | 11/1968 | New Zealand . |
| 345714 | 4/1931 | United Kingdom . |
| 862742 | 7/1957 | United Kingdom . |
| 901969 | 7/1962 | United Kingdom . |
| 991973 | 5/1965 | United Kingdom . |
| 1046065 | 10/1966 | United Kingdom . |
| 1340097 | 12/1973 | United Kingdom . |
| 1340432 | 12/1973 | United Kingdom . |
| 1343337 | 1/1974 | United Kingdom . |
| 1388270 | 3/1975 | United Kingdom . |
| 1460132 | 12/1976 | United Kingdom . |
| 1515511 | 6/1978 | United Kingdom . |
| 2008439 | 6/1979 | United Kingdom . |
| 1549789 | 8/1979 | United Kingdom . |
| 2026904 | 2/1980 | United Kingdom . |
| 2043489 | 10/1980 | United Kingdom . |
| 2075639 | 11/1981 | United Kingdom . |
| 2099724 | 12/1982 | United Kingdom . |
| 2131327 | 6/1984 | United Kingdom . |
| 2136221 | 9/1984 | United Kingdom . |
| 2155816 | 10/1985 | United Kingdom ................ 239/224 |

SPRAYING EQUIPMENT

This is a continuation of application Ser. No. 097,862, filed Sept. 17, 1987, now abandoned, which is a continuation of application Ser. No. 836,835, filed June 3, 1986, now U.S. Pat. No. 4,712,738, issued Dec. 15, 1987.

FIELD OF THE INVENTION

This invention relates to spraying equipment, particularly, although not exclusively, equipment for spraying herbicides and other agricultural or horticultural agents.

BACKGROUND OF THE INVENTION AND PRIOR ART

So-called "spinning disc" applicators for herbicides and other agents are known (see, for example, British Patent Specification No. 2131327). These applicators have a rotary distribution element or "disc" which is rotated at speeds of, for example, between 200 and 4000 rpm. The agent to be applied is fed to the surface of the disc and is ejected from the periphery of the disc by centrifugal force. Applicators of this type are capable of producing a well-defined spray pattern with an even droplet size under most conditions. The width of the spray pattern can be altered by changing the speed of rotation of the disc, and the spray density can be altered by changing the rate of flow of the agent to the disc. In the equipment of No. GB 2131327, a number of sockets are provided which communicate with restrictors of different sizes, and the rate of flow of the agent is changed by plugging a supply duct into the appropriate socket. A similar plug-and-socket system is used in one embodiment described in British Patent Specification No. 2155816, which also discloses another embodiment in which the flow rate is controlled by varying the width of an annular gap through which the agent flows to the disc. However, none of these constructions is capable of maintaining accurate control of the flow rate, while permitting easy adjustment.

BRIEF DESCRIPTION OF THE INVENTION

According to the present invention there is provided spraying equipment comprising delivery means for delivering fluid to be sprayed and a supply duct for supplying fluid to the delivery means, the supply duct including a variable restrictor for controlling the flow rate of the fluid, the restrictor comprising two relatively displaceable components provided, respectively, with inlet and outlet apertures, one of these components having a recess which defines with the other component a passage communicating with the aperture in the said one component, relative displacement of the two components altering the position of the aperture in the other component relatively to the recess, thereby to vary the flow rate of fluid through the restrictor.

The relative displacement of the two components may alter the length of the passage between the apertures and/or the minimum flow cross-section of the passage.

In a preferred embodiment, the delivery means comprises a rotatable disc mounted on a spraying head, the spraying head comprising the two components. The components are preferably rotatable relatively to each other about the rotary axis of the disc. The recess in the said one component may be formed in a surface of that component which extends transversely of the rotary axis of the disc, in which case the inlet aperture may be situated radially outwardly of the outlet aperture, with respect to the rotary axis. The recess may have a first portion which extends from a radially inner position to a radially outer position, and a second portion which extends circumferentially with respect to the rotary axis from the outer position of the first portion.

The first portion of the recess may have a constant cross-section throughout its length, but in a preferred embodiment the first portion has a width which decreases in the radially outward direction. The second portion may have a varying cross-section. For example, the second portion may, for example, have the form of a segment of a circle centered on the rotary axis of the disc. Alternatively, the second portion may be defined by two substantially arcuate edges having spaced centres. The recess may have a constant depth over its entire area, but in a preferred embodiment at least part of the second portion decreases in depth in the direction away from the first portion.

The outlet aperture may take the form of an annular gap defined between the two components. In a preferred embodiment, the two components are disposed one within the other, the inner component having a projection which extends through an opening in the outer component to define the annular gap. The projection may be provided with protuberances spaced around its periphery, these protuberances engaging the wall of the opening in the outer component in order to centre the projection within the opening.

DETAILED DESCRIPTION OF A PREFERRED EMBODIMENT

Figure 1:
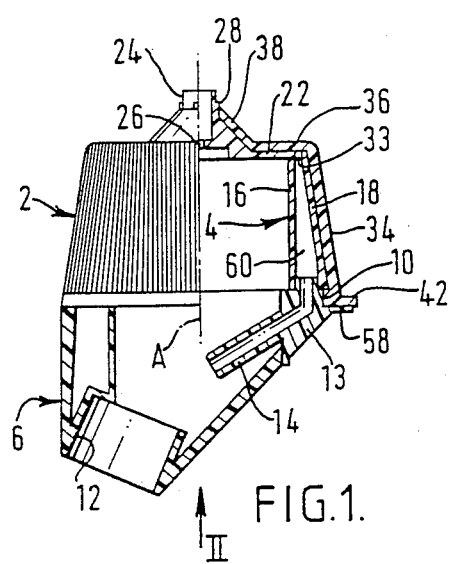
FIG. 1 is a partly sectioned side view of a spraying head.
Figure 2:
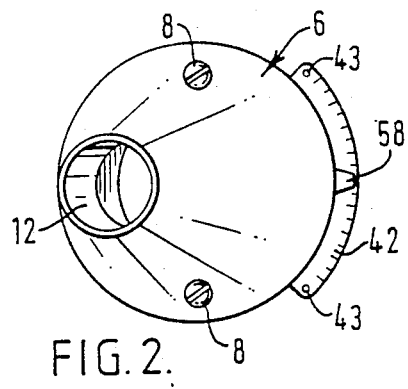
FIG. 2 is a view taken in the direction of the arrow II in FIG. 1.
Figure 3:
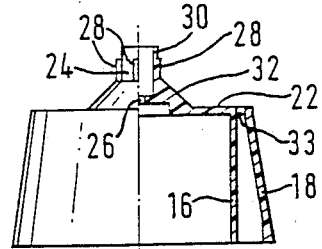
FIG. 3 is a partly sectioned side view of one component of the spraying head.
Figure 4:
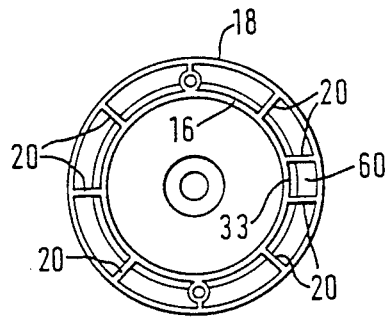
FIG. 4 is a view taken in the direction of the arrow IV in FIG. 3.
Figure 5:
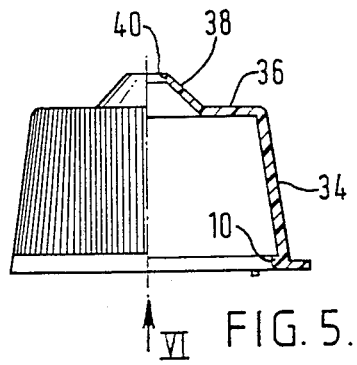
FIG. 5 is a partly sectioned side view of another component of the spraying head.

The spraying head shown in FIG. 1 comprises an outer component 2, an inner component 4 and a connector 6. The connector 6 is secured to the inner component 4 by screws 8 as shown in FIG. 2. The outer component has an inwardly directed annular rib 10, which engages a slot defined between the connector 6 and the inner component 4 to retain the outer component 2 on the inner component 4 in a manner which permits rotation of the outer component 2 relatively to the inner component 4.

The spraying head shown in FIGS. 1 and 2 is intended to be mounted on one end of an elongate support member, the other end of which has a handle so that an operator can hold the equipment by the handle with the head close to the ground. The connector 6 has a socket 12 for receiving the elongate support member. The connector 6 also has an insert 13, of transparent material, having a spigot 14 for receiving a fluid supply duct extending within the elongate support member fitted to the socket 12.

The inner component 4 has inner and outer walls 16 and 18 which are separated from each other by partitions 20. At one end of the walls 16 and 18 there is an end wall 22 from which extends a projection 24. In use of the head, the space within the inner wall 4 accommodates an electric motor, having an output shaft which extends through a small hole 26 in the end wall 22. A supply lead for the motor enters the connector 6 from the elongate support member through the socket 12. In use, a rotary disc is mounted on the output shaft of the motor for rotation about an axis A, so that fluid supplied to the disc is ejected from it by centrifugal force.

The inner wall 16 extends parallel to the axis A, but the outer wall 18 is inclined towards the axis A in the direction towards the end wall 22. As a result, the cavity defined between the inner and outer end walls 16 and 18 tapers in the direction towards the end wall 22. An aperture 33 is provided at the narrower end of this cavity between two adjacent partitions 20.

The projection 24 is provided with four equally spaced protuberances 28 in the form of splines. The splines 28 stop short of the end of the projection 24, leaving a plain cylindrical portion 30. The outer surface of the end wall 22 is connected to the projection 24 by a conical transition surface 32.

The outer component 2 has an outer wall 34 and an end wall 36 which lie, respectively, adjacent the outer wall 18 and the end wall 22 of the inner component 2. The end wall 36 of the outer component 2 has a conical portion 38 which lies adjacent the transition surface 32. At its inner end, the portion 38 defines an opening 40 which receives the projection 24, the splines 28 engaging the wall of the opening 40 to centre the projection 24 in the opening.

The outer wall 34 has, on its outer surface, formations such as knurling or serrations for assisting gripping of the component 2 to rotate it. At its end away from the end wall 36, the outer wall 34 has a projecting tab 42 provided with end abutments 43.

Figure 6:
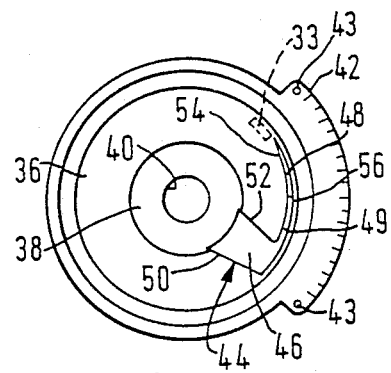
FIG. 6 is a view taken in the direction of the arrow VI in FIG. 5.

As shown in FIG. 6, the inner face of the end wall 36 is provided with a recess 44. This recess 44 comprises first and second portions 46 and 48, 49. The portion 46 extends substantially radially with respect to the axis A, being defined between two lines 50 and 52 which converge in the direction away from the axis A. The line 52 is parallel to a radial line from which it is spaced by a distance which may, for example, be between 4 mm and 5 mm. The line 50 is inclined at an angle of 45° to a radial line passing through its radially innermost end. The second portion 48, 49 is defined between a first arc 54 and a second arc 56. The arc 56 is centred on the axis A, while the centre of the arc 54 is spaced by approximately 1 mm from the axis A. The radius of the arc 56 is equal to the distance of the outer edge of the aperture 33 from the axis A, while the radius of the arc 54 is slightly smaller. The depth of the first portion 46 is constant over its entire area, and is preferably approximately 1 mm. The section 49 of the second portion of the recess tapers from the 1 mm depth of the portion 46 to a depth of approximately 0.5 mm, which is the depth of the section 48.

When the head is assembled, as shown in FIGS. 1 and 2, a pointer 58 provided on the transparent insert 13 of the connector 6 lies on the tap 42, to indicate the relative rotary positions of the outer component 2 and the unit comprising the inner component 4 and the connector 6.

In use of the equipment, liquid to be sprayed, such as herbicide, is supplied through the spigot 14 to a chamber 60 which is defined by the inner and outer walls 16 and 18 and by the two partitions 20 which lie one on each side of the aperture 33. The aperture 33 opens into the chamber 60, and allows the fluid to flow to the interface between the inner and outer components 2 and 4. Assuming that a flow path is provided between these components (as will be discussed later) the liquid flows to the opening 40 and is discharged through the spaces between the splines 28 to the spinning disc (not shown), from which it is ejected under centrifugal force in the form of droplets to be deposited on, for example, weeds to be killed.

The rate of flow of the fluid is controlled by adjusting the relative rotary position of the inner and outer components 2 and 4. By changing this relative position, the position of the aperture 33 with respect to the recess 44 is changed. Thus, to shut-off the flow of liquid altogether, the components 2 and 4 are rotated until the aperture 33 is moved out of register with any part of the recess 44, for example in the position indicated in dashed outline in FIG. 6. It will be appreciated that, as the components are relatively rotated to move the aperture 33 over the portion 48 of the recess 44, a gradually increasing flow cross-sectional area will become available at the junction between the aperture 33 and the recess 44. Liquid will then be able to flow through the aperture 33, and along the passage provided by the recess 44 to the interface between the transition surface 32 and the conical portion 38, and then to the disc. It will be appreciated also that, as the aperture 33 moves along the portion 48 towards the portion 46, the length of this passage will decrease, so decreasing the resistance to flow which is provided. In the fully open position, the aperture 33 is situated at the radially outer end of the portion 46, so that a maximum flow rate is obtained.

The tab 42 may be provided with markings such as H (representing a high flow rate) M (medium) and L (low), or provided with a numbered scale, as indicated in the drawings. Resilient teeth, or other mechanisms, may be provided for retaining the components 2 and 4 in any selected position with a click action.

I claim:

1. A spraying head body for supporting a rotary distribution element for rotation about a rotary axis, the body comprising:

an inner body component defining a cavity for receiving a motor, the inner body having a central opening centered on the rotary axis for receiving a drive spindle of the motor, and a central tubular projection which is coaxial with the central opening, a fluid inlet passage extending within the inner body component from a fluid inlet aperture to a second aperture which is spaced from the rotary axis; and an outer body component which is mounted on the inner body component for rotation about the rotary axis, the outer body component having a central opening which receives the tubular projection to define fluid outlet passage means, the outer body component having a circumferential groove of varying cross-sectional area along the length of the groove, which groove is situated at the same radial distance from the rotary axis as the second aperture of the inner body component so as to cooperate with the second aperture to permit fluid to flow from the passage in the inner body component to the groove at a flow rate determined by the position of the groove relative to the second aperture, the outer body component also having a radially extending groove which adjoins the circumferential groove and provides a fluid passageway from the circumferential groove towards the fluid outlet passage means.

2. A spraying head body according to claim 1, wherein the cavity in the inner body component is defined by a substantially cylindrical inner wall, the inner body component also having a tapering outer wall which is spaced from the inner wall.

3. A spraying head body according to claim 2, wherein the passage in the inner body component is defined by the inner and outer walls and by two partitions which extend between the inner and outer walls.

4. A spraying head body according to claim 1, wherein an inlet fitting is provided which engages the fluid inlet aperture of the fluid inlet passage in the inner body component, the inlet fitting forming part on an external wall of the body and being translucent in the portion thereof forming said external wall, so that the operator can visually ascertain the presence of fluid in said fitting.

5. A spraying head body according to claim 4, wherein said portion of said inlet fitting further includes a translucent pointer extending from the inner body component and wherein the outer body component includes a circumferentially projecting scale tab positioned adjacent said pointer to thereby provide a visual read-out of fluid flow.

6. A spraying head body according to claim 5, wherein said scale tab includes spaced apart stop elements sized to interact with said pointer to establish limits on the relative rotation of said body components.

7. A spraying head body according to claim 1, wherein the circumferential groove becomes wider and deeper as it approaches the radially-extending groove.

8. A spraying head body according to claim 1, wherein the circumferential groove becomes wider as it approaches the radially extending groove.

9. A spraying head body according to claim 1, wherein the circumferential groove becomes deeper as it approaches the radially extending groove.

* * * * *